United States Patent
Yassaie

[19]
[11] Patent Number: 5,977,995
[45] Date of Patent: *Nov. 2, 1999

[54] COMPUTER SYSTEM FOR DISPLAYING VIDEO AND GRAPHICAL DATA

[75] Inventor: Hossein Yassaie, Kings Langley, United Kingdom

[73] Assignee: VideoLogic Limited, Hertfordshire, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,257

[22] Filed: Nov. 30, 1995

Related U.S. Application Data

[63] Continuation of application No. 08/157,168, filed as application No. PCT/GB93/00749, Apr. 8, 1993.

[30] Foreign Application Priority Data

Apr. 10, 1992 [GB] United Kingdom .................... 9207972
Oct. 6, 1992 [GB] United Kingdom .................... 9221026

[51] Int. Cl.$^6$ ...................................................... G09G 5/36
[52] U.S. Cl. ........................................... 345/512; 345/509
[58] Field of Search .................................... 345/115, 189, 345/185, 201, 507, 509, 515, 192, 193, 508, 511, 512, 518; 395/153, 154, 162; 348/571, 584, 586

[56] References Cited

U.S. PATENT DOCUMENTS

| | | |
|---|---|---|
| 4,301,475 | 11/1981 | McCoy .................................... 348/584 |
| 4,631,588 | 12/1986 | Barnes et al. . |
| 4,677,488 | 6/1987 | Zato ........................................ 345/115 |
| 5,027,212 | 6/1991 | Marlton et al. . |
| 5,097,257 | 3/1992 | Clough et al. .......................... 345/196 |
| 5,243,447 | 9/1993 | Bodenkamp et al. .................. 345/133 |
| 5,264,837 | 11/1993 | Buehler .................................. 345/115 |

FOREIGN PATENT DOCUMENTS

| | | |
|---|---|---|
| 0 404 393 | 12/1990 | European Pat. Off. . |
| 0 454 414 | 10/1991 | European Pat. Off. . |
| 0 493 881 | 7/1992 | European Pat. Off. . |

OTHER PUBLICATIONS

Computer Technology Review, vol. 12, No. 4, Apr. 1992, Los Angeles US p. 1, B. Cahill.

Funkschau vol. 62, No. 26, Dec. 14, 1990, Munchen De pp. 60–75. Kamenzky et al. 'Computer mit Fernseh–Ambitionen'.

Primary Examiner—Chanh Nguyen
Attorney, Agent, or Firm—Flynn, Thiel, Boutell & Tanis, P.C.

[57] ABSTRACT

A computer which is capable of displaying both video and graphical data is provided with a central processing unit (10), a memory controller (14), and a display system (4). These units are all connected to a bus (16). Modular functional units (2), e.g. video codecs, TV outputs, audio subsystems, are used to provide optional additional functions for the display system. A coupling means (6, 12) is provided to link the modular functional units to the display system (4) and to the memory controller (14).

28 Claims, 6 Drawing Sheets

COMPUTER SYSTEM FOR DISPLAYING VIDEO AND GRAPHICAL DATA

This application is a continuation of U.S. Ser. No. 08/157,168, filed Dec. 6, 1993, now abandoned (which filing represents the nationalizing of PCT Serial No. PCT/GB93/00749 filed Apr. 8, 1993.

FIELD OF THE INVENTION

This invention relates to computers and in particular to computers which can display both video and graphics data.

BACKGROUND OF THE INVENTION

Historically, computer systems have been designed and produced without careful considerations for video and to a lesser extent audio capabilities. Many systems have been produced that add video capability to the computer system by colour keying and analogue multiplexing of the computer's graphics output. For example U.S. Pat. No. 5,027,212. Such systems generally involve multiple frame buffers holding video and graphics data separately. More recently a unified approach based on a single frame buffer of the type described in our International Patent Application No. PCT GB9202164 (published as PCT Application No. WO 93/10518 on May 27, 1993, and filed as U.S. Ser. No. 08/244,399 on Jul. 21, 1994) has been adopted. This approach treats video and graphics in exactly the same way. The single frame buffers can be based on either triple port memories or time multiplexing of video and graphics data on a common bus using suitable rate buffering and arbitration as described in the above numbered International patent application.

These techniques can be or have been used to integrate video into a computer display system. However, to date, such integration has been carried out within the constraints of the available personal computers and workstations. This has meant that such systems are costly and bulky and have limited expandability.

SUMMARY OF THE INVENTION

In preferred embodiments of this invention, a conventional graphics subsystem is closely coupled with a video processing subsystem capable of performing a number of essential functions described below. Both graphics and video processing subsystems have access to the shared frame buffer via the techniques described in International patent application no. PCT GB9202164. The combination consistutues a "videographics" subsystem which caters for cost effective and modular multimedia enablement.

Preferred embodiments of this invention seek to remove these limitations by moving to a computer architecture which takes the multimedia requirements into account in the initial system architecture.

Four preferred embodiments provide architectural structures that allow compact and cost effective multimedia computer systems to be constructed and configured. The modularity is achieved by equipping the base computer system with the required expansion capabilities and basic services allowing easy and cost effective addition of special function modules for multimedia capability. In particular, the proposed architecture caters for the inevitable trend towards very compact personal computers.

The proposed systems take into account the need to add efficiently special function modules, such as video codecs, (coder/decoders), still image compression, analogue video input, TV output and audio subsystems to a modern computer system. Four architectures are described. The first approach includes a videobus for moving high speed data between various functional modules and an integrated frame buffer. The integrated frame buffer combines the normal computer graphics with the video data. The functional modules are centrally controlled and fed with control signals and compressed data over a serial communications system. The second approach replaces the parallel videobus with a collection of additional point-to-point serial communications between the graphics subsystem and the functional modules. The third approach is a further extension of the first approach in that it combines the functionality of the high speed video bus with that of the serial connections carrying control/compressed data. In this aproach a single bus connects the various functional modules to the graphics/video subsystem. This single bus carries both data and control tokens which can include uncompressed and compressed video/audio data, set up and configuration data as well as other control data.

The fourth approach further combines the multimedia bus described in the third approach with the main computer bus. In this approach the single system bus will require to have both the necessary bandwidth and the real time capabilities required in a multimedia environment. All approaches partition the architecture in such a way as to both maximise system performance and minimise system cost by proper exploitation of silicon integrated trends.

The invention is defined in the appended claims to which reference should now be made.

BRIEF DESCRIPTION OF THE DRAWINGS

The invention will now be described in more detail, by way of example, with reference to the accompanying drawings in which.

DETAILED DESCRIPTION OF PREFERRED EMBODIMENTS

Videobus Based Architectures

Figure 1:
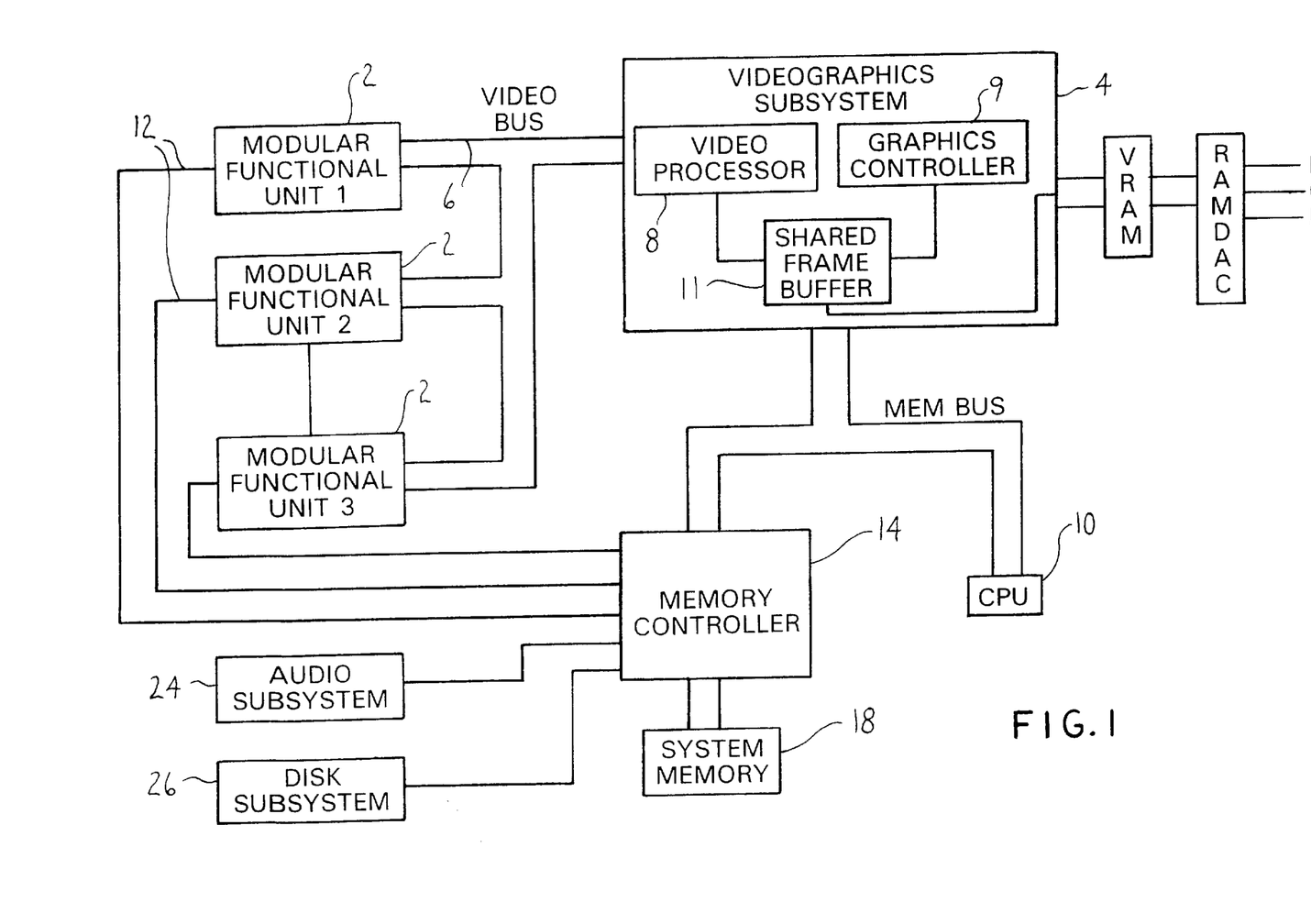
FIG. 1 shows a first computer system embodying the invention.

In this approach, as shown in FIG. 1, a plurality of modular functional units 2 are directly coupled to and communicate with a computer's videographics subsystem 4 via a videobus 6, the connections between the modular function unit 2 and the computer videographics sub-system preferably being bidirectional. The base videographics subsystem 4 includes a video processing unit 8, for carrying out processes such as format conversions (e.g. YUV to RGB etc.) and scaling functions along with a graphics controller 9 and circuits for combining video and graphics data in a shared frame buffer 11. An important feature of the proposed architectures is the incorporation of a number of video functions performed by the video processing unit in the normal computer graphics subsystem. These additional capabilities include but are not limited to:

1. Video scaling which allows the incoming video to be enlarged or scaled down before it is written into the shared frame buffer. The scaling down can be carried out using techniques covered in U.S. Pat. No. 5,027,212. The scale up can use techniques such as bilinear interpolation.
2. Video format conversion which supports conversion between various YUV and RGB video streams before the video data is written to the frame buffer. The particular formats of interest are YUV 422, YUV 411, YUV 444, RGB 24, RGB 16 (5,5,5 and 5,6,5) and RGB 8. The format conversion allows a degree of data compression as YUV format is denser than the conventional RGB. Also direct support for YUV allows lowcost interfacing to video digitisers which generally rely on YUV format. Also software video codecs can benefit from hardware support for their format conversion and scaling requirements. The format conversion can be done using a general 3×3 matrix multiplier architecture and conventional interpolating and decimating functions.
3. Video windowing which allows certain video pixels to be written to specific areas within a shared frame buffer and certain video pixels to be masked so that they are not loaded into the frame buffer 11. This will allow complex video windows and graphics overlays to be displayed in the graphics buffer.
4. A possible capability of the video processing system which is closely coupled to the graphics subsystem is the concept of pixel masking. This capability can be supported two ways. One is where a mask bit is supplied by a modular function unit 2 along a pixel stream. This mask bit determines whether a pixel is displayed or thrown away as it enters the shared frame buffer 11. The alternative approach is based on the video subsystem accessing a mask plane in the graphics memory and depending on the state of the mask bit update the shared frame buffer with the pixel data or not.
5. The video processing unit can access the graphics data and colour key the video by choosing a graphics colour for deciding whether a pixel in the shared frame buffer is overwritten by the incoming pixel stream.
6. The video processing unit has a decompression capability whereby it can decompress streams that it receives over the video bus or from the host via the graphics subsystem. This is necessary where video data has been stored in compressed form and is known as software playback of data.
7. All the features in 1–6 above can be accessed in software as an extension to graphics capabilities.
8. The video processing subsystem and the graphics subsystem both have access to the shared frame buffer 11. The techniques used to achieve this are described in International patent aplication No. PCT GB9202164/PCT Pub. No. WO-93-10518/U.S. Pat. application Ser. No. 08-244,399 where a small amount of buffer is provided for the video channel to deal with the real-time needs and the shared memory is arbitrated between the packetised video and the graphics controller. The buffer on the video channel allows critical activities such as memory refresh and screen updates to be carried out while the video data is collected in the buffer. During non critical graphics activites the video buffer 11 is emptied into the shared frame buffer while the graphics controller 9 is kept in an inactive state.
9. The video processing unit has an address generation unit allowing it to address the shared frame buffer in the required manner.
10. The video processing unit can also output proportions of the shared frame buffer with optional processing such as scaling to the video bus. A video encoder can be used to convert such regions of interest to a TV signal.

There are two main reasons for including the video postprocessing unit 8 as a central resource in the graphics/video (videographics) subsystem. One reason is that functions such as scaling and format conversion often result in an increase in bandwidth. By including these functions as a postprocessing activity in the graphics/video subsystem, the actual required bandwidth between the modular functional units and the graphics/video subsystem is minimised. This results in a much less complex videobus specification and demands less performance from the videobus. The second reason for the inclusion of the video processing unit as a central resource in the graphics/video subsystem is that all the modular functional units 2 can share this resource which results in simplifications in these units, and hence cost reduction.

The scaling operation can compensate for aspect ratio differences between a computer display and the incoming video signal as well as up/down scaling of the video to fit users requirements.

The modular functional units 2 communicate with a CPU 10 through a collection of serial communications links 12. These communications links originate from a memory controller 14 and each connects to an individual modular functional unit 2. The CPU 10, the memory controller 14 and the videographics subsystem 4 are the three main elements of the base computer that are tightly coupled over a high performance bus 16 (Mem Bus). The memory controller 14 supports memory accesses to a system memory 18 originating from the CPU 10 and from the graphics subsystem 4 as well as providing direct memory access (DMA) channels via the serial communications links 12 to the modular functional units 2. This arrangement effectively decouples the tightly coupled CPU/memory/graphics subsystems from the optional and the more loosely coupled multimedia functional units 2.

The independent DMA support, via the memory controller 14 and communications links 12, for the modular functional units 2 ensures that the real time control needs of the modular function units are met without frequent intervention from the CPU 10.

This approach also reduces the complexity of the support software needed in the system. This is particularly so since the DMA capability and the intelligence level of the memory controller unit can be modified towards a balanced operation.

Each modular functional unit 2 can read from or write to a relevant region of interest in the shared frame buffer, 11 within the videographics subsystem 4. Mask planes in the graphics subsystem are used to control active areas associated with each video window. The access of the functional units 2 to the shared videobus is time multiplexed. The protocol for this multiplexing can be sub-line, line or region oriented. The exact choice will vary the extent of the buffering needed in each functional unit and the degree of context required in the video processing unit.

Examples of the modular functional units include video Digitisers, TV Encoders H261 video conferencing module, MPEG decoder and JPEG still image coders/decoders.

Figure 2:
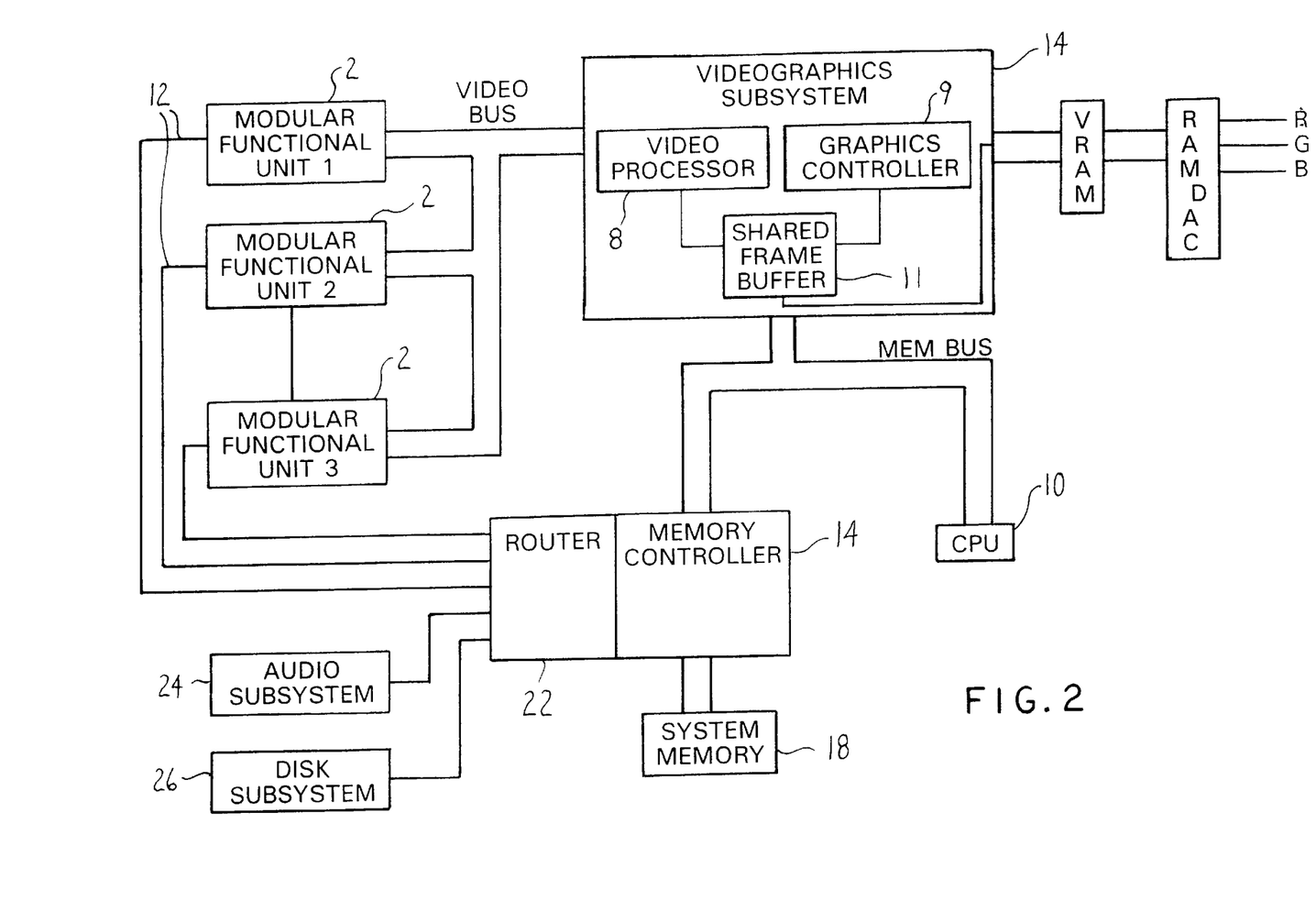
FIG. 2 shows a second computer system embodying the invention.

An enhanced version of the system is shown in FIG. 2, where the memory controller 14 incorporates an intelligent router 22 which allows functional units 2 to communicate with each other directly. In this system by simply adding headers to data packets travelling on the serial links, the router will be able to set up dynamic circuits between various modules without interfering with the CPU or the system memory.

Figure 2A:
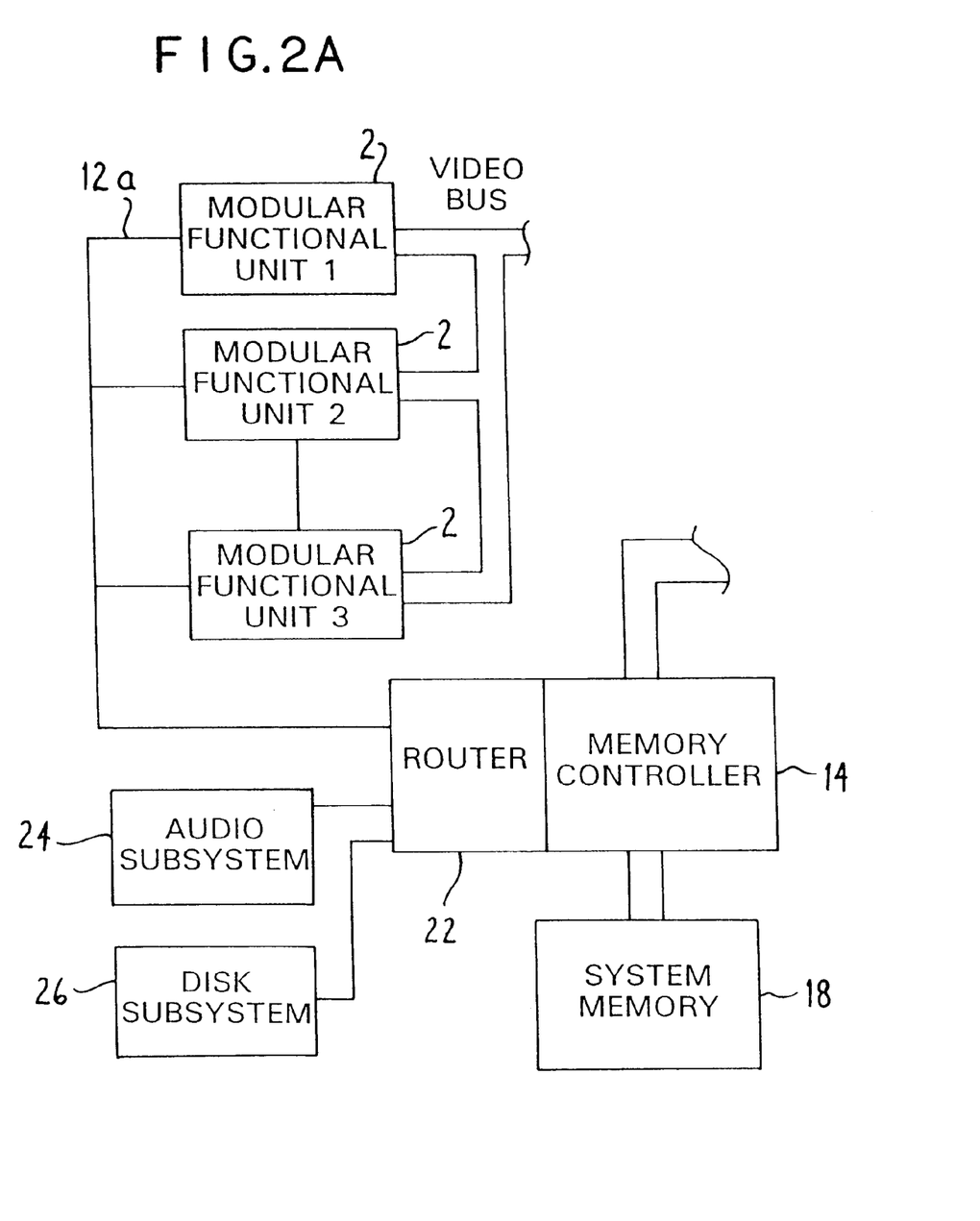
FIG. 2A shows a second version of the second computer system embodying this invention.

Alternatively, the point-to-point connections between the memory controller and the functional units 2 can be replaced with a single serial bus 12a (FIG. 2A). Such a system will of course offer lower performance.

Also as shown in FIG. 1, the architecture easily allows inclusion of an audio subsystem 24 (digital signal processor, DSP) via a serial connection. In fact the DMA driven serial connections originating from the memory controller offer an ideal mechanism for adding other key subsystems such as disk 26 (or disk arrays) as demonstrated in FIG. 1.

Networking (LAN's, MAN's, WAN's) interfaces can also be added to the system in a similar manner. Again the impact of these options on the CPU will be minimal as any real time transaction can take place via the memory control with little CPU intervention.

Direct Architecture

Figure 3:
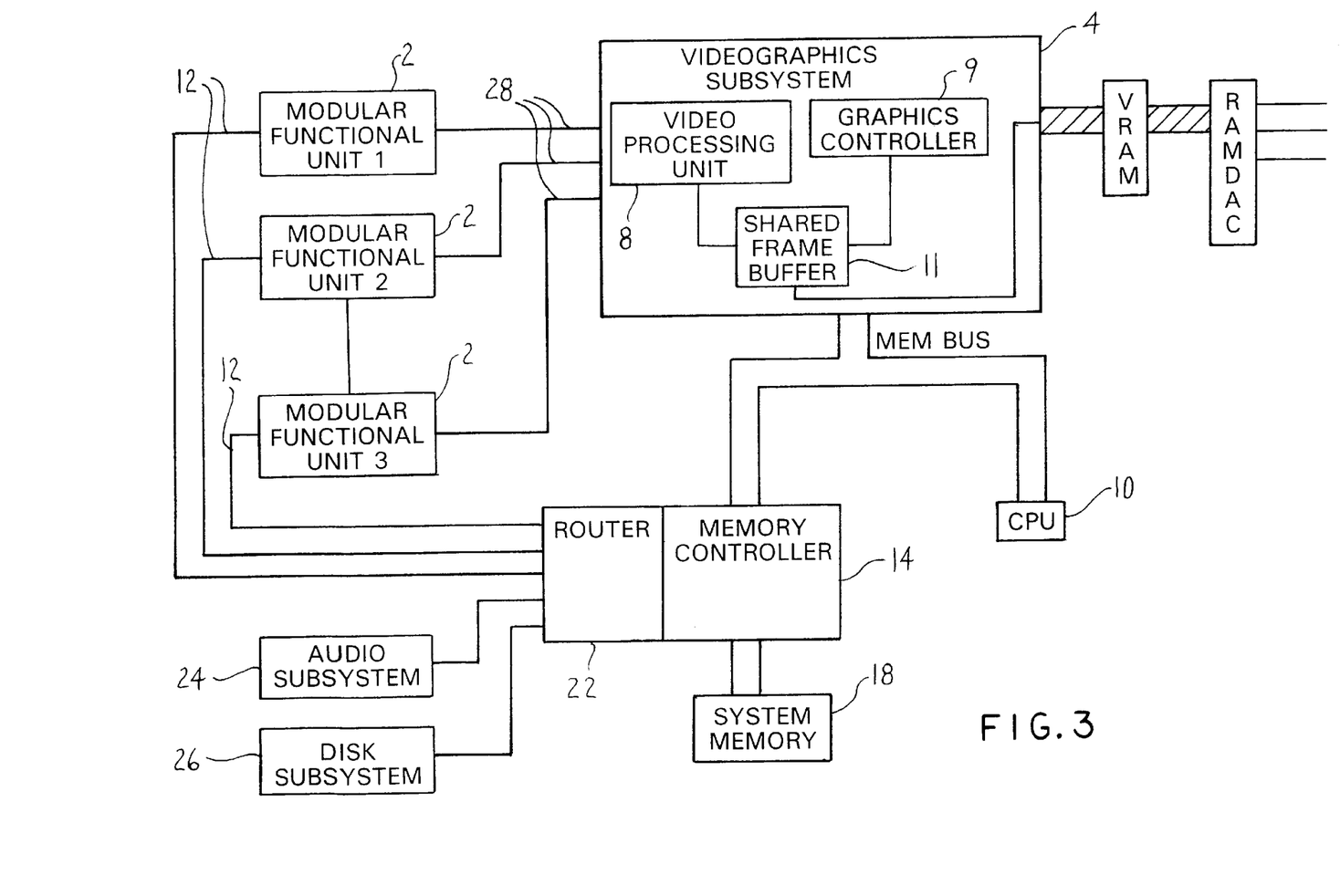
FIG. 3 shows a third computer system embodying the invention.

In this second approach the videobus is replaced with multiple point-to-point bi-directional serial connections 28 between the functional units 2 and graphics/video subsystem 4. This is shown in FIG. 3. In this approach the video processing unit will sufficiently buffer the data arriving from or leaving over each serial connection. The video post processing (format conversion/scaling) is then carried out on a time multiplexing basis. Leaving the format conversion and scaling function to the graphics/video subsystem 4 (as compared to the operation being done by individual functional units) ensures minimisation of the data rate requirement for the serial connections 28.

The basic operation of this approach is very similar to that described for the videobus based architecture. The advantage of the Direct Architecture is in minimisation of parallel buses. This has three major benefits:
1. A very compact base machine can be provided.
2. Much better utilisation of space on optional functional units is possible by virtue of avoiding large connector areas; and
3. Real-time performance requirement can be addressed in a much easier way as various activities are highly decoupled.

It is proposed that the systems embodying the invention can be provided such that each block shown in the figures can be provided on a single chip thereby enabling a very compact computer to be produced. Thus all that is needed is a chip for the CPU, a chip for the graphics/video subsystem, and a chip for the memory controller/router. Alternatively all may be provided on a single chip or combinations of the various units may be provided on single chips.

MULTIMEDIA BUS APPROACH

Figure 4:
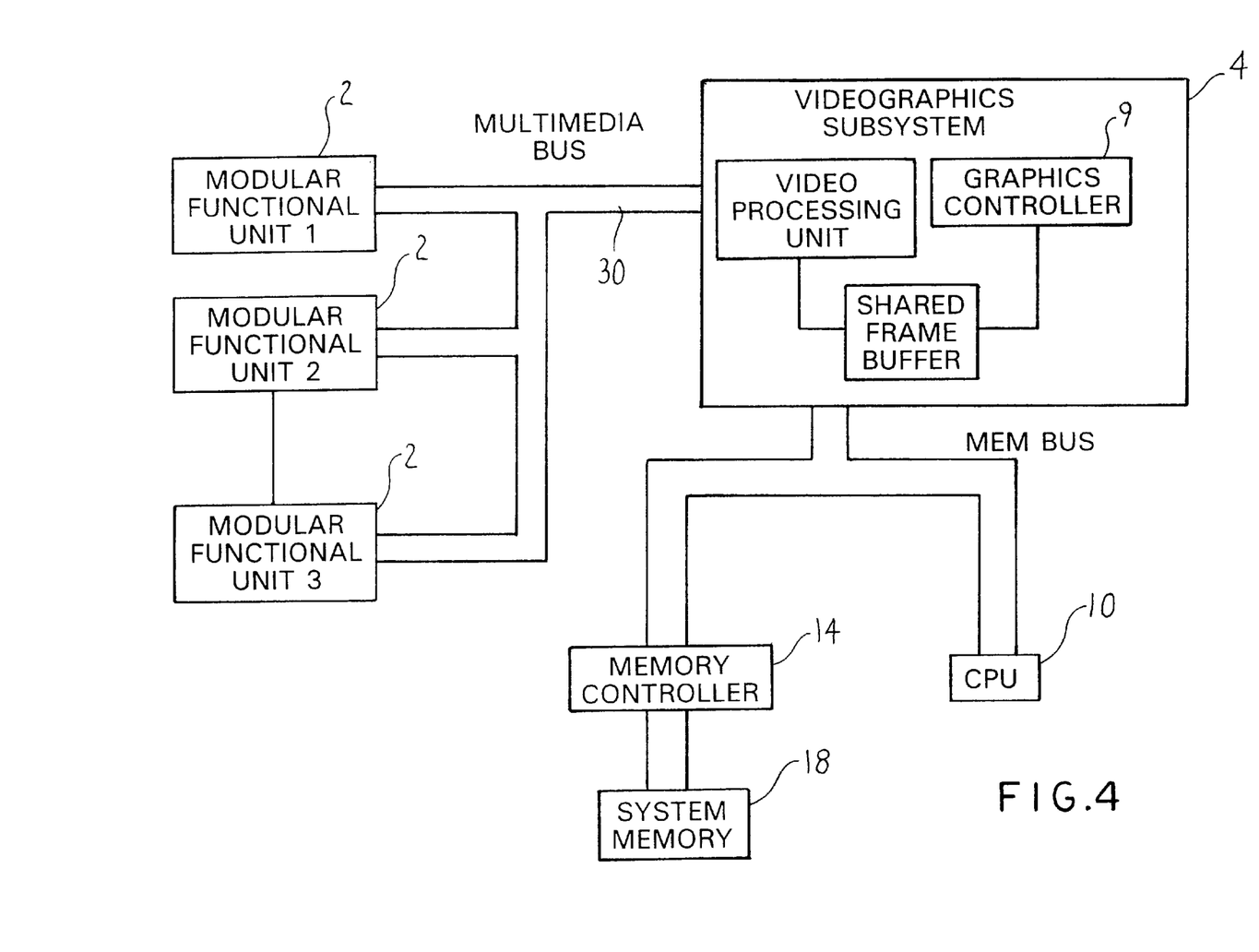
FIG. 4 shows a computer system, which modifies the embodiment of FIG. 1.

In FIG. 4 there is shown a further extension of the embodiment of FIG. 1 in which the videobus 6 and serial connectors 12 of the system of FIG. 1 are combined into a single multimedia bus 30 which carries both data (video, audio, compressed and uncompressed), and the control information previously transmitted by the serial communication links 12 of FIG. 1. This has all the advantages associated with a combined graphic and video subsystem, capable of video scaling and format conversion.

The multimedia bus 30 operates in a time sharing mode using a packetised data/control protocol. The exact nature of the protocol employed is not critical to the present invention and various options will be known to those skilled in the art. All that is required is an arbitration and scheduling scheme which can allocate sufficient bandwidth to each device and guarantee a worst case latency in operation. Such an approach allows the real time need needs of the system to be met. For example, a round robin scheduler allocating different amounts of time to each device can both provide the bandwidth in a predetermined way and obtain a worst case system latency. Multiple priorities can be added to the scheduler to allow a reduced latency figure for those devices which are allocated a higher priority.

SINGLE BUS APPROACH

Figure 5:
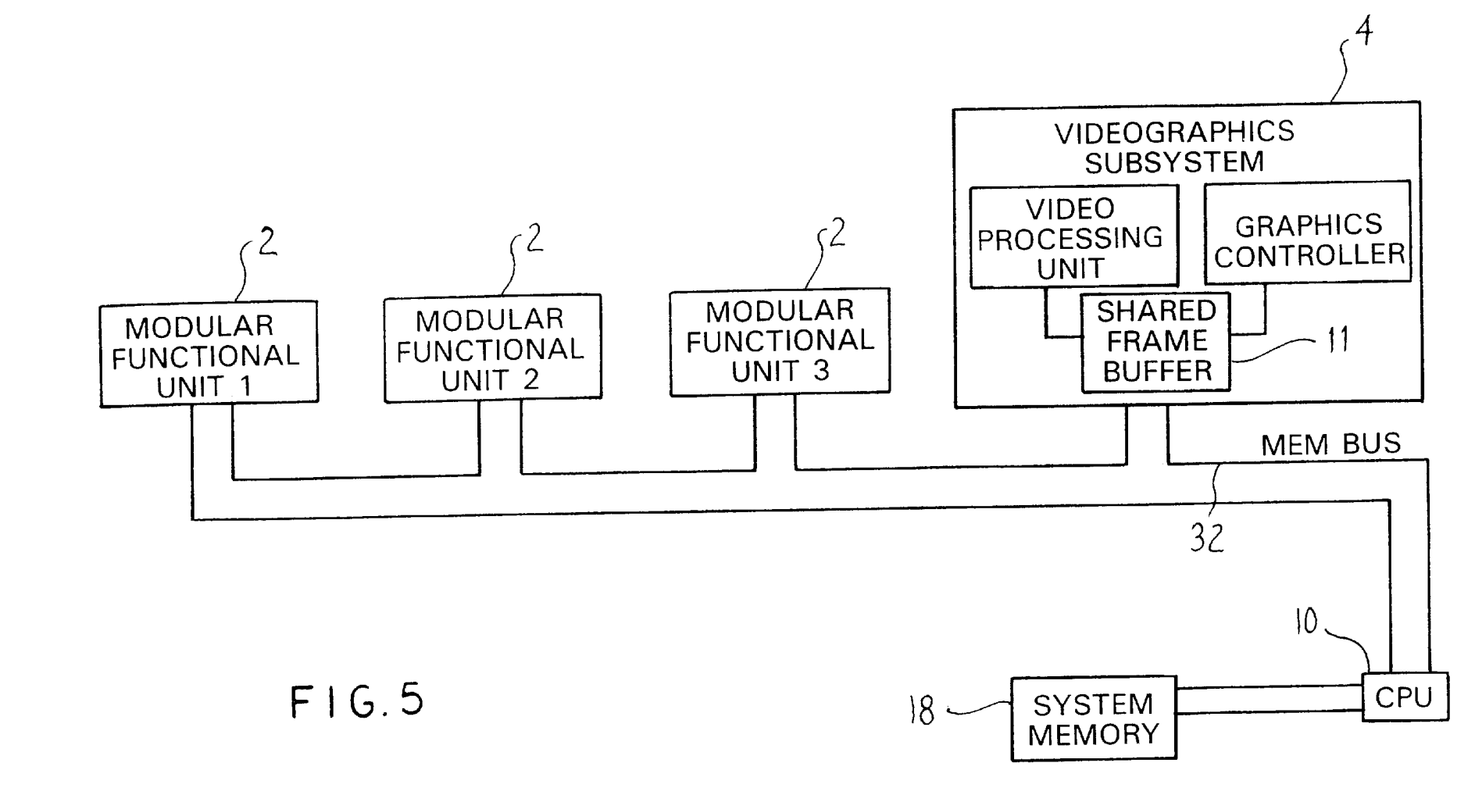
FIG. 5 shows a fourth embodiment of the invention.

A fourth approach illustrated in FIG. 5 combines the multimedia bus of FIG. 4 with the main computer bus. This gives a system bus 32 coupling the videographics subsystem 4, CPU 10, and the modular functional units 2. The main requirement of this combined system bus is that it should be capable of real time operation. Thus it must be able to operate in such a way as to be able to allocate sufficient bandwidth to each device and to guarantee a worst case latency. Preferably it operates using the same type of packetised data/control protocol as that referred to with reference to FIG. 4. Again the videographics subsystem is capable of video scaling and format conversion and thus possesses all the advantages described with reference to FIG. 1.

In all of the above cases the integration of the video processing subsystem and the graphics subsystem into a single videographics subsystem capable of performing both graphics and video functions (scaling, format, conversion, windowing and masking) is an important part of the proposed invention. The functionality of the graphics and the video processing, sharing the same frame buffer, can be implemented in any one of many VLSI devices.

I claim:

1. A computer for displaying both video and graphical data comprising:

a central processing unit for generating display processing instructions;

a system memory for holding said display processing instructions generated by said central processing unit;

a memory controller for controlling access to said system memory;

a display system;

means for coupling at least one modular function unit to the memory controller and to the display system;

wherein, said display system comprises: a video processing means for processing video image signals received from at least one modular function unit, said video processing means producing a set of processed video signals from said video image signals in response to said display processing instructions; a graphics subsystem for generating graphic image signals in response to said display processing instructions; and a single shared frame buffer connected directly to said video processing means and said graphics sub-system so that said video processing means and said graphics sub-system write said processed video signals and said graphic image signals directly to said shared frame buffer so that said shared frame buffer stores integrated video data and graphics data that define a combined video-and-graphics display; and a first bus connected between said central processing unit, said memory controller and said display system, wherein said display processing instructions are exchanged over said bus.

2. The computer according to claim 1 in which said coupling means comprise bidirectional connections between the at least one modular functional unit and said display system.

3. The computer according to claim 1 wherein said display system is adapted to be connected to a plurality of modular function units and the modular functional units make time multiplexed accesses to said display system.

4. The computer according to claim 1 in which the coupling means comprises a plurality of point to point communications links for coupling the memory controller to a plurality of modular functional units.

5. The computer according to claim 4 in which the memory controller includes a router connected to said communication links, said router being configured to allow the modular functional units to communicate with each other.

6. The computer according to claim 1 in which the memory controller is coupled to said system memory by a dedicated memory bus.

7. A computer according to claim 1 in which the central processing unit, the memory controller, and the display system are each provided on a separate integrated circuit.

8. A computer according to claim 1 in which at least two of: the central processing unit; the memory controller; and the display system, are provided on a single chip.

9. The computer according to claim 1 in which the coupling means includes a multimedia bus linking a plurality of modular functional units to the display system wherein said multimedia bus is separate from said first bus.

10. The computer according to claim 9 in which the multimedia bus operates in a time sharing mode for the transmission of data and control signals.

11. The computer according to claim 1, wherein said coupling means is a multimedia bus extending between said display system and the at least one modular function unit.

12. A computer according to claim 11, in which said multimedia bus operates in a time sharing mode for the transmission of data and control signals.

13. The computer according to claim 1 in which the video processing means includes a video scaling means.

14. The computer according to claim 13 in which the video processing means further includes video format conversion means.

15. The computer according to claim 1 in which:
the video processing means further includes masking means to protect areas of said shared frame buffer said masking means maintains a plurality of variable-state mask bits, each mask bit corresponding to a separate pixel location of the display stored by said shared frame buffer; and
wherein said video processing means is further configured to selectively write a processed video signal into a selected pixel location in said shared frame buffer based on the state of the mask bit for the pixel location maintained by said masking means.

16. The computer according to claim 14 in which the video processing means further includes decompression means for software playback of data.

17. The computer according to claim 13 in which the video processing means further includes decompression means for software playback of data.

18. The computer system according to claim 1, wherein said display system is configured so that said video processing means receives video images for processing directly from the at least one modular function without any intermediate storage of the video image signals.

19. The computer system of claim 1, wherein:
said frame buffer has a plurality of memory locations for storing said image signals so that said frame buffer stores the combined video-and-graphics display; and
said video processing means is further configured to overwrite said processed video signals into selected said shared frame buffer memory locations to produce an updated video-and-graphics display.

20. A digital data processing system for integrating video and graphic image signals, the video image signals being initially generated by at least one modular function unit, said system including:
a video processor unit for receiving the video image signals from the at least one modular function unit and selectively processing said video image signals in response to a set of video processing instructions to produce a set of regenerated video image signals representative of a video image to be displayed;
a graphics processor unit configured to receive graphics generation instructions that, in response to receiving said instructions, generates graphic image signals representative of a graphics image to be displayed;
a single shared frame buffer having a first input port for receiving said regenerated video image signals directly from said video processor unit and a second input port for receiving said graphic image signals directly from said graphics processor unit, said frame buffer capable of storing said regenerated video image signals and said graphic image signals as a single set of signals representative of a single frame of an image to be displayed, said frame buffer further including an output port through which said frame image signals are outputted; and
a central processing unit connected to said video processing unit and said graphics processor unit, said central processing unit being configured to generated said video processing instructions and said graphics generation instructions.

21. The digital data processing system of claim 20 wherein:
the at least one modular function unit generates the video image signals in response to a set of modular function unit control instructions; and
said central processing unit is further configured to generate said modular function unit control instructions; and said system further includes:
a memory bus connected to said central processing unit, said video processor unit, and said graphics processor unit wherein said video processing instructions and said graphics generation instructions are forwarded to said video processor unit and said graphics processor unit over said memory bus;
a video bus connected between the at least one modular function unit and said video processing unit over which the video image signals are selectively forwarded to said video processing unit; and
a modular function unit control link connected between the at least one modular function unit and said central processing unit over which said modular function unit control instructions are forwarded to the at least one modular function unit.

22. The digital data processing system of claim 21 wherein said modular function unit control link is a serial data path.

23. The digital data processing system of claim 22 further includes a plurality of said serial data paths for connecting a plurality of modular function units to said system and wherein said video bus is configured to be connected to the plurality of modular function units.

24. A digital data processing system for integrating video and graphical image signals, the video image systems being generated by at least one modular function unit in response to receiving a set of modular function unit control instructions, said system including:

a video graphics system including:

a video processor unit for receiving the video image signals from the at least one modular function unit and selectively processing said video image signals in response to a set of video processing instructions so as to produce a set of regenerated video image signals representative of a video image to be displayed;

a graphics processor unit configured to receive graphics generation instructions, that in response to receiving said instructions, generates graphics image signals representative of a graphics image to be displayed; and a memory connected directly to said video processor unit and said graphics processor unit for receiving and storing said regenerated video image signals and said graphics image signals directly in a single shared frame buffer wherein said regenerated video image signals and said graphics image signals are integrated in said shared frame buffer to define a combined video-and-graphics image;

a central processing unit for generating a set of control instructions to the at least one modular function unit, said video processing instructions and said graphics generation instructions;

a memory bus connected to said central processing unit and said video graphics system wherein said video processing instructions and said graphics generation instructions are forwarded over said memory bus;

a video bus connected between the at least one modular function unit and said video processor unit over which said video image signals are selectively forwarded to said video processor unit; and a modular function unit control link separate from said memory bus connected between the at least one modular function unit and said central processor unit over which said modular function unit control instructions are forwarded to the at least one modular function control unit.

25. The digital data processing system of claim 24, wherein said shared frame buffer has a first input port for receiving said regenerated image signals from said video processor unit a second input port for receiving said graphics image signals directly from said graphics processor unit and a single output port through which said integrated regenerated video image signals and said graphics image signals are outputted.

26. A digital data processing system for integrating video and graphical image signals, the video image signals being generated by at least one modular function unit in response to a set of modular function unit control instructions, said system including:

a video graphics system including:

a video processor unit for receiving video image signals from the at least one modular function unit and selectively processing said video image signals in response to a set of video processing instructions so as to produce a set of regenerated video image signals representative of a video image to be displayed;

a graphics processor unit configured to receive graphics generation instructions and in response to receiving said instructions to generate graphic image signals representative of a graphics image to be displayed; and a single shared frame buffer having a first input port for receiving said regenerated video image signals directly from said video processor unit and a second input port for receiving graphic image signals directly from said graphics processor unit, said buffer capable of storing said regenerated video image signals and said graphic image signals as a single set of signals representative of a single image frame, said shared frame buffer further including an output port through which the frame image signals are outputted;

a central processing unit for generating the modular function unit control instructions to the at least one modular function unit, said control instructions controlling the video image signals forwarded to said video processor unit, said central processing unit further capable of generating said video processing instructions to said video processor unit and said graphics generation instructions for said graphics processor unit;

a memory bus connected between said central processing unit and said video graphics system wherein, said video processing instructions and said graphics generation instructions are forwarded to said video processor unit and said graphics processor unit over said memory bus;

a video bus connected between the at least one modular function unit and said video processor unit over which the video image signals are selectively forwarded to said video processor unit; and a modular function unit control link separate from said memory bus connected between the at least one modular function unit on said central processing unit over which said modular function unit control instructions are forwarded to the at least one modular function unit.

27. A computer for displaying both video and graphical image signals comprising:

a central processing unit for generating display processing instructions;

a system memory for holding display processing instructions generated by said central processing unit;

a memory controller for controlling access to said system memory;

a display system, said display system comprising:

a video processing means for processing video image signals received from at least one modular functional unit, said video processing means producing a set of processed video signals from said video image signals in response to said display processing instructions;

a graphics sub-system for generating graphic image signals in response to said display processing instructions; and a single shared frame buffer, wherein said video processing means and said graphics sub-system are coupled to said frame buffer so as to write said processed video signals and said graphic image signals directly to said shared frame buffer so that said processed video signals and said graphic image signals are integrated in said shared frame buffer to define a combined video-and-graphics display; and a first bus connected between said central processing unit, said memory controller and said display system, wherein said display processing instructions are exchanged over said bus; and means for coupling at least one modular functional unit to the memory controller and to the display system, wherein the means for coupling comprises a plurality of point-to-point connections coupling the memory controller to the modular functional unit.

28. A computer for displaying both video and graphical image signals comprising:
- a central processing unit for generating display processing instructions;
- a system memory for holding said display processing instructions generated by said central processing unit;
- a memory controller for controlling access to said system memory;
- a display system, said display system comprising:
  - a video processing means for processing video image signals received from at least one modular functional unit, said video processing means producing a set of processed video signals from said video image signals in response to said display processing instructions;
  - a graphics sub-system for generating graphic image signals in response to said display processing instructions; and
  - a single shared frame buffer, wherein said video processing means and said graphics sub-system are coupled to said frame buffer so as to write said processed video signals and said graphic image signals directly to said shared frame buffer so that said processed video signals and said graphic image signals are integrated in said shared frame buffer to define a combined video-and-graphics display; and
- a first bus connected between the said central processing unit, said memory controller and said display system, wherein said display processing instructions are exchanged over said bus; and means for coupling at least one modular functional unit to the memory controller and to the display system wherein the means for coupling comprises a plurality of point-to-point connections for coupling the modular functional unit to the display system.

* * * * *